United States Patent
Mo (10) Patent No.: US 12,337,732 B2
(45) Date of Patent: Jun. 24, 2025

(54) CARRIER FOR INFANTS AND YOUNG CHILDREN WITH AN IMPROVED SLIDING MECHANISM

(71) Applicant: WONDERLAND SWITZERLAND AG, Steinhausen (CH)

(72) Inventor: Xiaolong Mo, Steinhausen (CH)

(73) Assignee: WONDERLAND SWITZERLAND AG, Steinhausen (CH)

( * ) Notice: Subject to any disclaimer, the term of this patent is extended or adjusted under 35 U.S.C. 154(b) by 221 days.

(21) Appl. No.: 17/869,980

(22) Filed: Jul. 21, 2022

(65) Prior Publication Data

US 2023/0024000 A1  Jan. 26, 2023

(30) Foreign Application Priority Data

Jul. 21, 2021 (CN) .......................... 202110824004.1

(51) Int. Cl.
*B60N 2/28* (2006.01)
(52) U.S. Cl.
CPC ......... *B60N 2/2824* (2013.01); *B60N 2/2821* (2013.01); *B60N 2/2887* (2013.01)
(58) Field of Classification Search
CPC ............................ B60N 2/2824; B60N 2/2887
See application file for complete search history.

(56) References Cited

U.S. PATENT DOCUMENTS

| | | | |
|---|---|---|---|
| 2007/0069562 A1* | 3/2007 | Van Montfort ...... | B60N 2/2824 297/253 |
| 2008/0030052 A1* | 2/2008 | Chen ....................... | F16B 7/105 297/256.16 |
| 2008/0303321 A1* | 12/2008 | Powell ................. | B60N 2/2863 297/216.11 |
| 2009/0096265 A1* | 4/2009 | Miura ...................... | B60N 2/14 297/344.14 |
| 2009/0102257 A1* | 4/2009 | Collias ..................... | B60N 3/06 297/256.16 |

(Continued)

FOREIGN PATENT DOCUMENTS

| | | |
|---|---|---|
| CN | 1037110 A | 11/1989 |
| CN | 103619648 A | 3/2014 |

(Continued)

OTHER PUBLICATIONS

Taiwan Office Action issued in corresponding Taiwan Application No. 111127427, dated Jan. 6, 2023.

(Continued)

*Primary Examiner* — David R Dunn
*Assistant Examiner* — Tania Abraham
(74) *Attorney, Agent, or Firm* — HAUPTMAN HAM, LLP (57) ABSTRACT

A carrier for infants and young children with an improved sliding mechanism, which includes a carrier body, a rail member, a sliding member, a guide sliding member, and a positioning member. The rail member is disposed on the carrier body. The sliding member is connected to the rail member and is capable of sliding linearly. The sliding member is in rolling contact with the guide sliding member when sliding linearly with respect to the rail member. The positioning member is configured to fix a position of the sliding member after the sliding member slides linearly with respect to the rail member.

9 Claims, 11 Drawing Sheets

(56) References Cited

U.S. PATENT DOCUMENTS

| | | | | |
|---|---|---|---|---|
| 2009/0184549 A1* | 7/2009 | Kassai | ................. | B60N 2/2806 |
| | | | | 297/216.11 |
| 2011/0109138 A1* | 5/2011 | Inoue | ................... | B60N 2/2806 |
| | | | | 297/256.13 |
| 2011/0233374 A1 | 9/2011 | Clement et al. | | |
| 2013/0026804 A1* | 1/2013 | Guo | ..................... | B60N 2/2806 |
| | | | | 297/250.1 |
| 2016/0200225 A1* | 7/2016 | Van Der Veer | ...... | B60N 2/2863 |
| | | | | 297/256.16 |
| 2018/0079331 A1* | 3/2018 | Williams | ............. | B60N 2/2824 |
| 2019/0077281 A1* | 3/2019 | B?hm | ................. | B60N 2/2884 |

FOREIGN PATENT DOCUMENTS

| | | | |
|---|---|---|---|
| CN | 105015377 | A | 11/2015 |
| CN | 204821215 | U | 12/2015 |
| DE | 102015212769 | B4 | 4/2019 |
| EP | 1033280 | A2 | 9/2000 |
| GB | 2530375 | B | 8/2020 |
| TW | 201601951 | A | 1/2016 |
| WO | WO-2020110553 | A1 * | 6/2020 |

OTHER PUBLICATIONS

German Office Action issued in corresponding German Application No. 10 2022 118 295.9, dated Dec. 6, 2023, pp. 1-11.

\* cited by examiner

CARRIER FOR INFANTS AND YOUNG CHILDREN WITH AN IMPROVED SLIDING MECHANISM

CROSS REFERENCE TO RELATED APPLICATION

The present application claims priority to Chinese Patent Application No. 2021108240041, entitled "CARRIER FOR INFANTS AND YOUNG CHILDREN WITH AN IMPROVED SLIDING MECHANISM", filed on Jul. 21, 2021, the content of which is incorporated herein by reference in its entirety.

TECHNICAL FIELD

The present disclosure provides a carrier for infants and young children, and more particularly, a carrier for infants and young children with an improved sliding mechanism.

BACKGROUND

Carriers for infants and young children, such as a safety seat mounted on the back seat of a car for infants to lie down or for young children to ride, or a stroller, a crib and a dining chair, etc., are commonly equipped with a sliding mechanism, such as armrests of the stroller, or foot frames of the crib and dining chairs. In terms of the safety seat, in addition to a conventional type that the safety seat is fastened to the back seat of the car through seat belts, there are also safety seats provided with a load leg on the front side of a base, and each of two sides of the rear side of the base is provided a connecting arm with an ISOFIX port. The safety seat can be quickly and stably positioned on the back seat of the car, by snapping the connecting arms into slots, which is also the ISOFIX ports, and extending the load leg to be placed on the footrest between the front seat and the back seat of the car.

However, the load leg of the above-mentioned base mainly includes an outer tube and an inner tube. The outer tube is sleeved on an inner tube, and the outer tube and the inner tube can slide relative to each other. In this case, a surface of the inner tube is tightly attached to the outer tube, resulting in a sliding contact between the surfaces, in turn resulting in obvious frictional resistance when the outer tuber slides relative to the inner tube, leading to a situation in which the inner tube is stuck easily and cannot be extended and retracted smoothly when sliding. This situation not only occurs on the base of the above-mentioned safety seat, but also on the sliding mechanisms disposed on the carries for infants and young children, such as the above-mentioned stroller, crib or dining chair. The present disclosure is aimed to solve the above-mentioned problems.

SUMMARY

The present disclosure provides a carrier for infants and young children with an improved sliding mechanism, which includes a carrier body, a rail member, a sliding member, a guide sliding member, and a positioning member. The rail member is disposed on the carrier body. The sliding member is connected to the rail member and is capable of sliding linearly with respect to the rail member. The guide sliding member is disposed on one of the rail member and the sliding member, and the sliding member is in rolling contact with the guide sliding member when sliding linearly with respect to the rail member. The positioning member is disposed between the rail member and the sliding member. The positioning member is configured to fix a position of the sliding member after the sliding member slides linearly with respect to the rail member.

BRIEF DESCRIPTION OF THE DRAWINGS

In order to illustrate the technical solutions in the embodiments of the present application or prior art more clearly, the accompanying drawings used in the description of the embodiments will be briefly introduced below. Apparently, the accompanying drawings in the following description only illustrate some embodiments of the present application. For those of ordinary skill in the art, other drawings can also be derived from these drawings without creative effort.

REFERENCE NUMERALS LIST

1—safety seat; 2—base; 3—load leg; 31—outer tube; 311—tail end; 312—through hole; 313—inner wall; 32—inner tube; 321—connecting end; 322—abutting end; 323—fastening hole; 33—fixed base; 331—mounting groove; 331*a*—oil storage space; 332—coupling portion; 333—ring portion; 34—ball; 35—shaft member; 36—end sleeve; 37—tube base; 38—fastener; 381—engaging portion; 382—toggle portion; 39—shaft member; 30—reset elastic member; 4—connecting arm; 41—guide sleeve; 42—sliding tube; 421—outer wall; 422—limiting hole; 43—fixed base; 431—mounting groove; 44—ball; 45—stopper pin; 46—connecting rod; 5—supporting frame; 51—front section; 52—fixed base; 521—mounting groove; 53—ball; 6—sliding sleeve; 61—inner wall; 62—snapper; 621—compression spring; 63—tension spring; 7—stroller; 71—outer tube; 72—inner tube; 8—crib; 81—outer tube; 82—inner tube; 9—dining chair; 91—outer tube; 92—inner tube.

DETAILED DESCRIPTION OF THE EMBODIMENTS

The present disclosure provides a carrier for infants and young children with an improved sliding mechanism, which includes a carrier body, a rail member, a sliding member, a guide sliding member and a positioning member. The rail member is disposed on the carrier body. Optionally, the rail member is fixed or movable on the carrier body. The sliding member is connected to the rail member and can slide linearly with respect to the rail member. The guide sliding member is disposed on one of the rail member and the sliding member. The sliding member is in rolling contact with the guide sliding member when sliding linearly with respect to the rail member. The positioning member is disposed between the rail member and the sliding member. The positioning member is adapted to fix a position of the sliding member after the sliding member slides linearly with respect to the rail member.

The carrier for infants and young children with an improved sliding mechanism of the present disclosure generally refers to a carrier used by the infants and young children, such as safety seats, strollers, cribs or dining chairs, all of which belong to the carrier for infants and young children of the present disclosure, which is set forth herein for explanation. In order to fully understand the objects, features and effects of the present disclosure, the safety seat is taken as a specific embodiment, in conjunction with the accompanying drawings of the description, to detailly describe the present disclosure, and the description is as follows.

Figure 1:
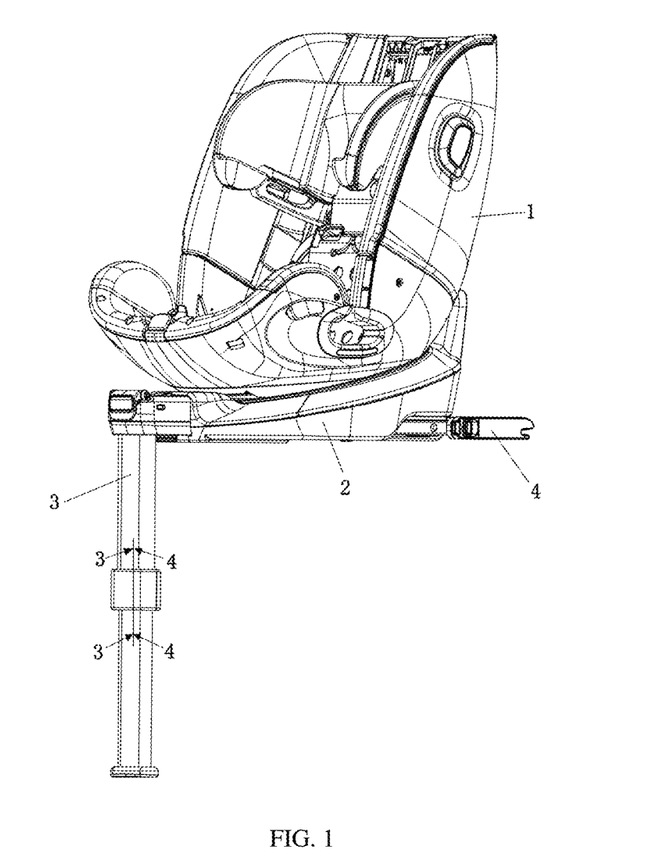
FIG. 1 is a perspective view of a safety seat according to a specific embodiment of the present disclosure.
Figure 6:
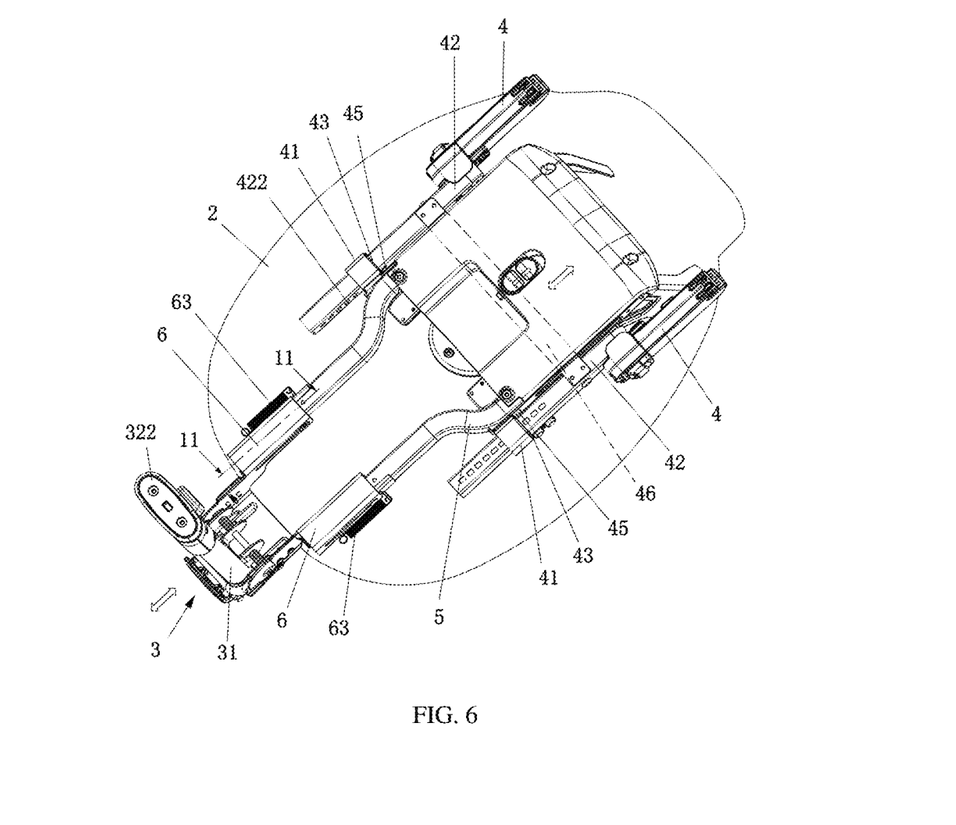
FIG. 6 is a perspective view of a second set of sliding mechanisms and a third set of sliding mechanisms disposed on a bottom side of a base according to a specific embodiment of the present disclosure.

Firstly, referring to FIG. 1, the carrier body is a base 2 of a safety seat 1 in this embodiment. A load leg 3 is disposed on the front side of the base 2, and each of two sides of the back side of the base 2 is provided with a connecting arm 4 with an ISOFIX port. The bottom side of the base 2 is provided with a supporting frame 5 (as shown in FIG. 6). In this embodiment, the safety seat 1 can be placed on a back seat of a car (not shown in the figure) together with the base 2. In this case, the two connecting arms 4 is extended out from the base 2 to be snapped into a slot (not shown in the figure) which is also the ISOFIX port on the back seat of the car; and the load leg 3 is extended to be placed on the footrest between the front seat and the back seat of the car, so that the safety seat 1 is positioned on the back seat of the car. In the safety seat 1 according to the specific embodiment of the present disclosure, the base 2 of the safety seat 1 includes three sets of sliding mechanisms, including a first set of sliding mechanisms by which the load leg 3 itself can be extended and retracted, a second set of sliding mechanisms by which the connecting arm 4 can be extended and retracted with respect to the base 2, and a third set of sliding mechanisms by which the load leg 3 can be extended and retracted with respect to the base 2. Embodiments of the present disclosure describing these sliding mechanisms will be further described below.

Embodiment of the First Set of Sliding Mechanisms

Figure 2:
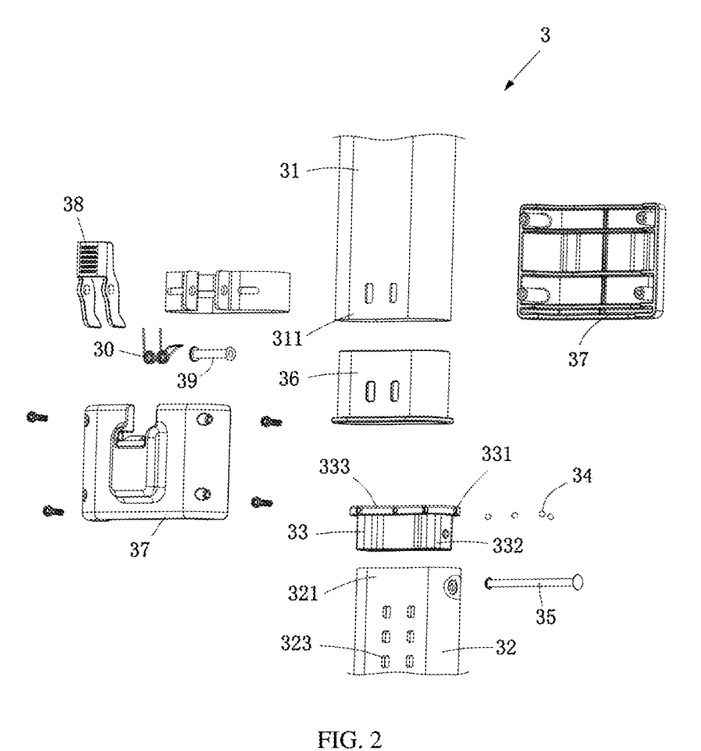
FIG. 2 is a partial exploded view of a first set of sliding mechanisms according to an embodiment of the present disclosure.
Figure 3:
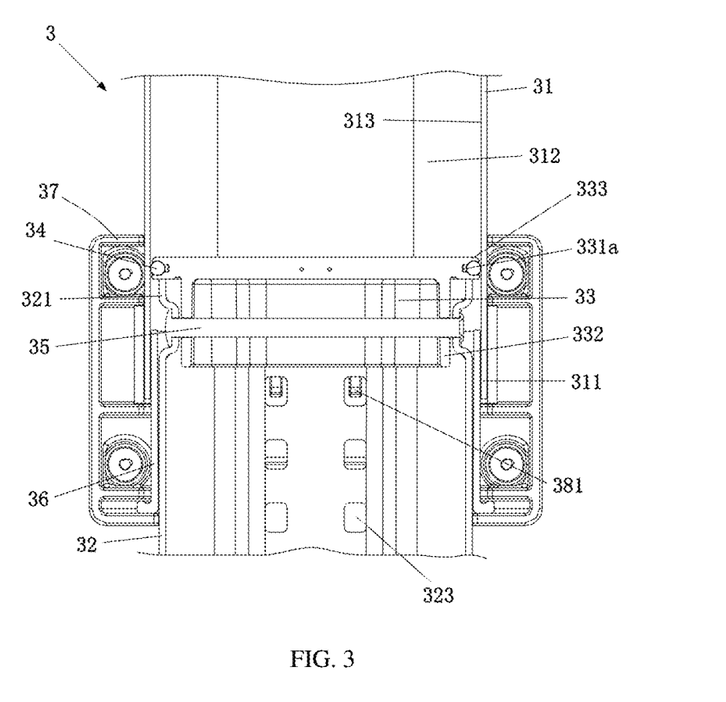
FIG. 3 is a cross-sectional view taken along a line 3-3 of FIG. 1.
Figure 4:
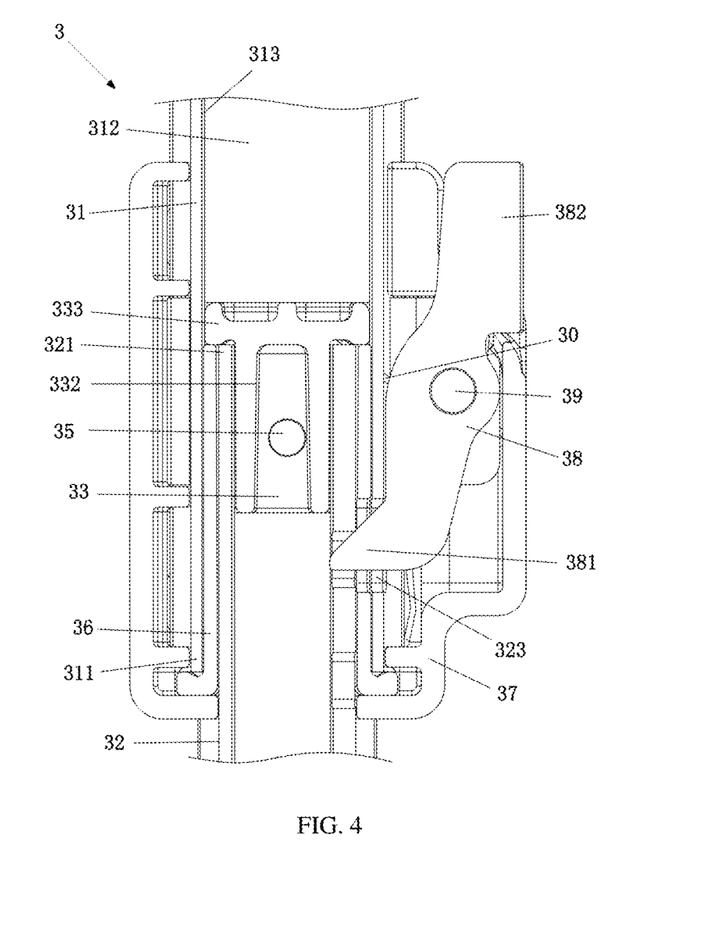
FIG. 4 is a cross-sectional view taken along a line 4-4 of FIG. 1.
Figure 5:
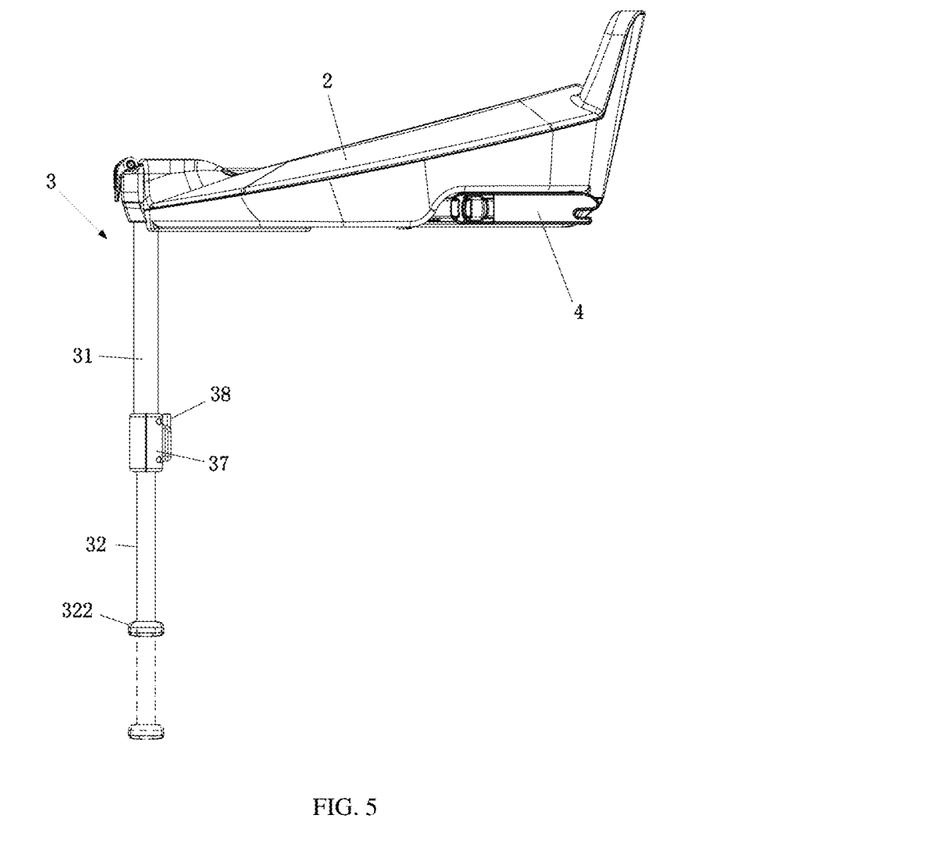
FIG. 5 is a schematic view showing extending and retracting of a load leg of the first set of sliding mechanisms according to the embodiment of the present disclosure.

FIGS. 2 to 5 show an embodiment of the first set of sliding mechanisms. In this embodiment, the load leg 3 includes an outer tube 31 and an inner tube 32, and the outer tube 31 is used as the rail member, and the inner tube 32 is used as the sliding member. The outer tube 31 includes a tail end 311 that is the end of the outer tube 31 away from the base 2. A through hole 312 is disposed in the outer tube 31. The through hole 312 extends in the outer tube 31 from the tail end 311. The inner tube 32 includes a connecting end 321 and an abutting end 322 at different two ends, respectively. The connecting end 321 is provided with the guide sliding member which is inserted into the through hole 312 from the tail end 311 to be connected to the outer tube 31 (as shown in FIGS. 3 and 4). That is, the inner tube 32 is at least partially disposed in the outer tube 31. The abutting end 322 is exposed to the outer tube 31 (as shown in FIG. 5).

In the embodiment of the first set of sliding mechanisms, the guide sliding member includes a fixed base 33 and a plurality of balls 34. The fixed base 33 is fixedly disposed on the connecting end 321 of the inner tube 32. The fixed base 33 includes a plurality of mounting grooves 331. The plurality of mounting grooves 331 are arranged along the circumference of the fixed base 33 (as shown in FIG. 2). The plurality of balls 34 are mounted in the respective mounting groove 331 along the circumference of the fixed base 33. Each of the balls 34 can rotate freely in the respective mounting groove 331. When the connecting end 321 is inserted into the through hole 312 from the tail end 311 to be connected to the outer tube 31, the connecting end 321 is in rolling contact with an inner wall 313 of the outer tube 31 through the plurality of balls 34, and the inner tube 32 is extended and retracted with respect to the outer tube 31 and slides linearly (as shown in FIG. 5), that is, the inner tube 32 is extended out from the outer tube 31 and is placed at the footrest between the front seat and the back seat of the car; or when the inner tube 32 is retracted into the outer tube 31 (for example, when the safety seat 1 is not in use), the inner tube 32 is in rolling friction with the inner wall 313 of the outer tube 31 through the plurality of balls 34, so as to achieve the effect of smooth sliding.

As described above, the fixed base 33 of this embodiment, as shown in FIGS. 2 and 3, is integrally formed and includes a coupling portion 332 and a ring portion 333. In this embodiment, the coupling portion 332 is fixedly connected to the connecting end 321 by extending a shaft member 35 through the coupling portion 332 and the connecting end 321. The ring portion 333 is located on one end of the coupling portion 332. The ring portion 333 protrudes toward a lateral direction of the coupling portion 332. The mounting grooves 331 are arranged along the periphery of the ring portion 333. In this embodiment, each mounting groove 331 includes an oil storage space 331a (as shown in FIG. 3). The oil storage space 331a is adapted to store pre-filled lubricating oil, thereby providing auxiliary lubrication when the plurality of balls 34 are in rolling contact with the inner wall 313. In addition, in this embodiment, an end sleeve 36 is disposed on the tail end 311 of the outer tube 31, and the end sleeve 36 is extended into the through hole 312, so that the end sleeve 36 blocks the connecting end 321 in the through hole 312, and the connecting end 321 in the through hole 312 is prevented from coming out of the outer tube 31 from the tail end 311.

In the embodiment of the first set of sliding mechanisms, the positioning member includes a tube base 37 and a fastener 38. As shown in FIGS. 2 and 4, the tube base 37 is fixed on the tail end 311 of the outer tube 31, and the fastener 38 is movably disposed on the tube base 37. The inner tube 32 includes a plurality of fastening holes 323. The plurality of fastening holes 323 are arranged at intervals along a length direction of the inner tube 32. When an extending length of the inner tube 32 with respect to the outer tube 31 is adjusted and the inner tube 32 linearly slides to a selected position, the fastener 38 can be fastened to the fastening hole 323 at the corresponding position, so that the length of the inner tube 32 extending out of the outer tube 31 can be fixed at the selected position.

In this embodiment, the fastener 38 is pivotally connected to the tube base 37 by extending a shaft member 39 through the fastener 38 and the tube base 37, so that the fastener 38 is pivotable with the shaft member 39 as a center. The fastener 38 includes an engaging portion 381 and a toggle portion 382. The engaging portion 381 corresponds to and can be respectively engaged with each of the fastening holes 323. toggle portion 382 is disposed on a different position from that of the engaging portion 381. In this embodiment, a reset elastic member 30 is sleeved on the shaft member 39. In this embodiment, the reset elastic member 30 is a torsion spring. An end of the reset elastic member 30 is abutted against the tube base 37, and another end of the reset elastic member 30 is abutted against the toggle portion 382. When the toggle portion 382 is toggled, the reset elastic member 30 is compressed to generate a restoring elastic force. When the toggle portion 382 is released, the toggle portion 382 is pushed back by the restoring elastic force, so that the engaging portion 381 is reset to be engaged with the fastening hole at the corresponding position.

Embodiment of the Second Set of Sliding Mechanisms

Figure 7:
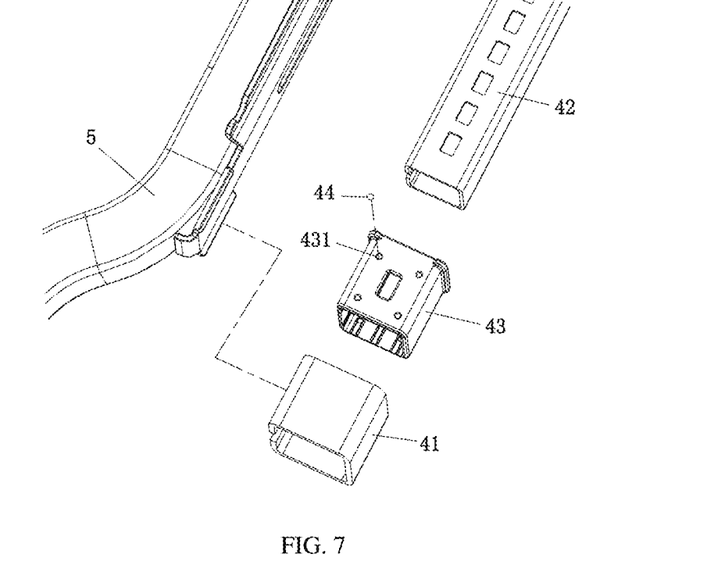
FIG. 7 is an exploded view of the second set of sliding mechanisms according to an embodiment of the present disclosure.
Figure 8:
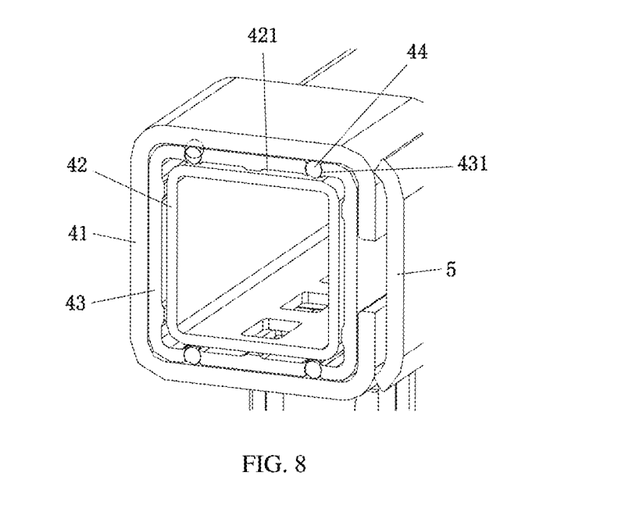
FIG. 8 is a cross-sectional view of the second set of sliding mechanisms according to an embodiment of the present disclosure.
Figure 9:
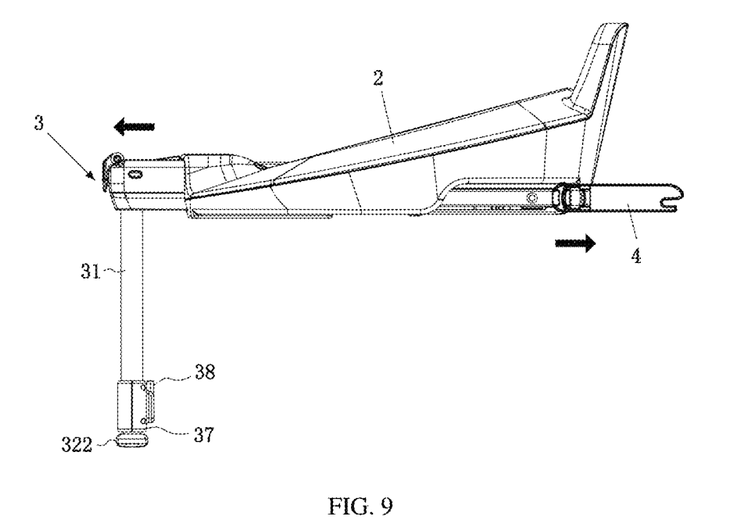
FIG. 9 is a schematic view showing a load leg and a connecting arm which are extended from a base according to a specific embodiment of the present disclosure.

FIGS. 6 to 8 show an embodiment of the second set of sliding mechanisms. in this embodiment, each of two sides of the supporting frame 5 is are provided with a guide sleeve 41 and a sliding tube 42, the guide sleeve 41 is used as the rail member, and the sliding tube 42 is used as the sliding member. The two sliding tubes 42 are respectively provided with the connecting arms 4 with the ISOFIX port at the end on the same side. Each of the sliding tube 42 is inserted through the corresponding guide sleeve 41 and is linearly slidable. As shown in FIGS. 7 and 8, each of the guide sleeves 41 is provided with the guide sliding member. In this embodiment, each guide sliding member includes a fixed base 43 and a plurality of balls 44. The fixed base 43 is fixed inside the guide sleeve 41. The fixed base 43 includes a plurality of mounting grooves 431 evenly distributed on the side surfaces of the fixed base 43. The plurality of balls 44 are respectively mounted in the plurality of mounting grooves 431. Each of the guide sleeves 41, and an outer wall 421 of the sliding tubes 42 inserted through the guide sleeve 41, are in rolling contact with the plurality of balls 44. When the sliding tube 42 slides linearly with respect to the guide sleeve 41, that is, when the sliding tube 42 is extended out from the guide sleeve 41, and the connecting arm 4 on one of ends of the sliding tubes 42 is engaged with a slot on the back seat of the car, which is also a ISOFIX port (as shown in FIG. 9); or when the sliding tubes 42 is retracted with respect to the guide sleeve 41 (for example, when the safety seat 1 is not in use), the outer wall 421 of the sliding tube 42 is in rolling friction with the guide sleeve 41 through the balls 44 to achieve the effect of smooth sliding.

In the embodiment of the second set of sliding mechanisms, the two sliding tubes 42 respectively includes a plurality of limiting holes 422. The plurality of limiting holes 422 of each sliding tube 42 are arranged at intervals along a length direction of the sliding tube 42. In this embodiment, the positioning member is a stopper pin 45 corresponding to each of sliding tubes 42. When each of the sliding tubes 42 linearly slides to a selected position with respect to the guide sleeve 41 through which the sliding tube 42 is inserted, for example, the two sliding tubes 42 linearly slide to cause the connecting arm 4 to be extended or retracted. That is, the positioning sliding tube 42 is blocked and positioned at the selected position by inserting the stopper pin 45 into the limiting hole 422. In addition, in this embodiment, the two sliding tubes 42 are connected by a connecting rod 46 (as shown in FIG. 6) to be able to perform the linear sliding synchronously. The connecting rod 46 is slidably disposed on the supporting frame 5.

Embodiment of the Third Set of Sliding Mechanisms

Figure 10:
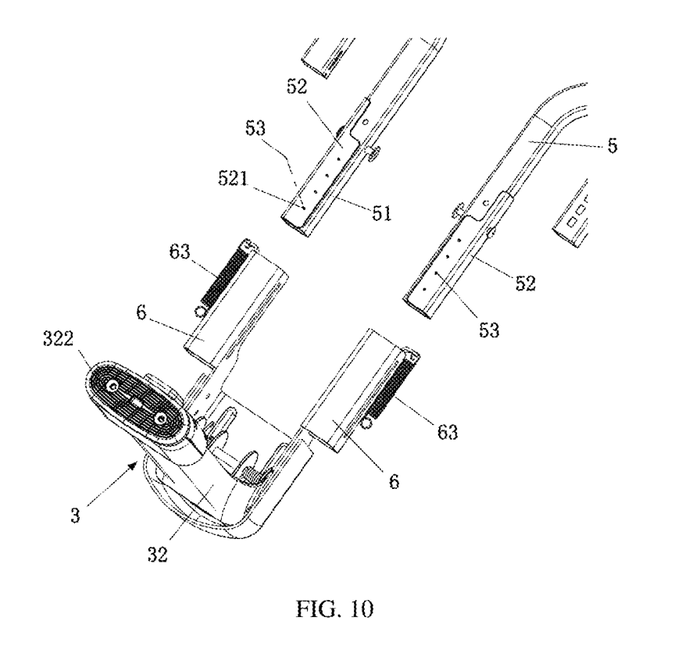
FIG. 10 is an exploded view of the third set of sliding mechanisms according to an embodiment of the present disclosure.
Figure 11:
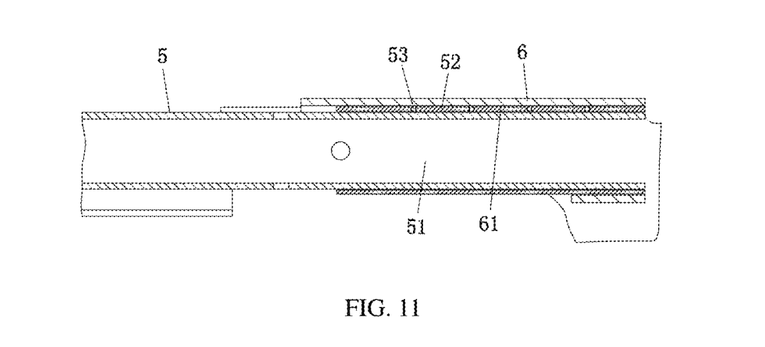
FIG. 11 is a cross-sectional schematic view taken along a line 11-11 of FIG. 6.

FIGS. 10 to 13 show an embodiment of the third set of sliding mechanisms. In this embodiment, the supporting frame 5 includes a pair of front sections 51, and the load leg 3 includes a pair of sliding sleeves 6. In this embodiment, the front section 51 of the supporting frame 5 is used as the rail member, and the sliding sleeve 6 of the load leg 3 is used as the sliding member. The pair of sliding sleeves 6 is sleeved on the pair of front sections 51 and is linearly slidable. Each of the front sections 51 is provided with the guide sliding member. In this embodiment, each guide sliding member include a fixed base 52 and a plurality of balls 53. The fixed base 52 is elongated and fixed on the front section 51. The fixed base 52 has a substantially C-shaped cross section. The fixed base 52 includes a plurality of mounting grooves 521. In this embodiment, the plurality of mounting grooves 521 are arranged in a straight line along a surface of a bottom side of the fixed base 52. The plurality of balls 53 are respectively mounted in the mounting grooves 521, so that each front section 51, and an inner wall 61 of the sleeve 6 into which the front section 51 is inserted, are in rolling contact with the plurality of balls 53, on the bottom side of the fixed base 52 (as shown in FIG. 11). When the pair of sliding sleeves 6 slide linearly with respect to the pair of front sections 51, that is, the load leg 3 is extended out from the base 2 when in use (as shown in FIG. 9), or is retracted with respect to the base 2 when not in use, the inner wall 61 of the sliding sleeve 6 is in rolling friction with the front section 51 through the plurality of balls 53 to achieve the effect of smooth sliding. However, the present disclosure is not limited to the above-mentioned the plurality of balls 53 being mounted on the surface of the bottom side of the fixed base 52, as long as the resistance can be reduced when the sliding sleeve 6 slides linearly with respect to the front section 51 to make the sliding smooth. However, in different embodiments, the plurality of mounting grooves 521 may be arranged in a straight line along surfaces of the top and bottom sides of the fixed base 52, and the balls 53 (not shown in the figure) are respectively mounted in the mounting grooves 521, so that the sliding sleeve 6 linearly slides with respect to the front section 51 more smoothly.

Figure 12:
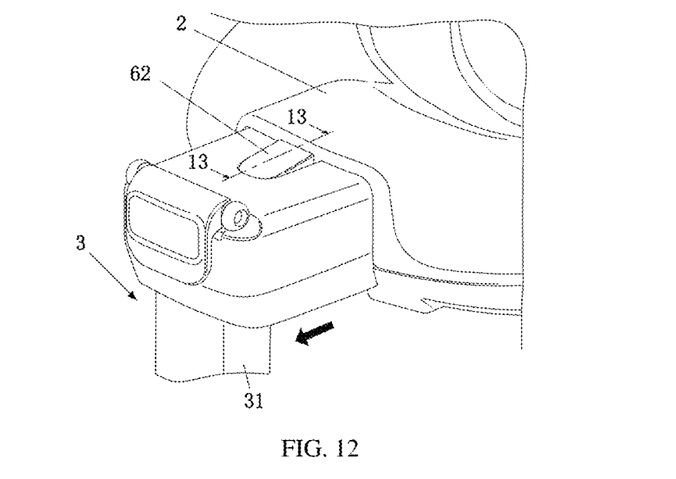
FIG. 12 is a schematic view showing a snapper raised for blocking and positioning when the load leg of FIG. 9 is extended from the base.
Figure 13:
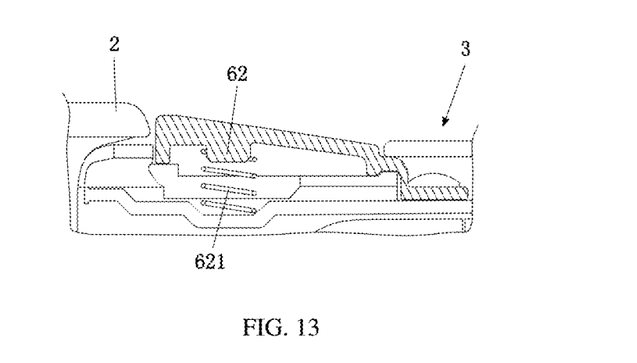
FIG. 13 is a partial cross-sectional view taken along a line 13-13 of FIG. 12.

In the embodiment of the third set of sliding mechanisms, as shown in FIGS. 10 and 12, the positioning member includes a snapper 62 and a pair of tension springs 63. The snapper 62 is disposed on the load leg 3 and is supported by a compression spring 621, so that the snapper 62 is normally tilted (as shown in FIG. 13). One of the tension springs 63 is disposed on a side of one of the sliding sleeves 6, and the other tension spring 63 is disposed on a side of the other sliding sleeve 6. An end of each of the tension springs 63 is fixed to the bottom side of the base 2, and the other end of each of the tension springs 63 is fixed to the sliding sleeve 6. When the load leg 3 is extended as the sliding sleeves 6 linearly slide with respect to the respective front section 51 until the snapper 62 is tilted, the snapper 62 forms a block on the side of the base 2 for positioning. In this case, the tension spring 63 is in a stretched state. In addition, when the snapper 62 is pressed to lose the blocking for the base 2, the load leg 3 is retracted toward the base 2 under the restoring force of the tension spring 63.

The carrier for infants and young children according to the present disclosure improves the sliding mechanisms, that is, each set of sliding mechanisms is provided with the guide sliding member between the rail member and the sliding member, so that the frictional resistance when the sliding member slides linearly with respect to the rail member is effectively reduced. Compared with the sliding mechanism of the conventional carrier for infants and young children, the carrier for infants and young children according to the present disclosure avoids the sliding jam caused by the sliding contact between the surfaces of the sliding mechanisms, thereby avoiding unsmooth expansion and contraction, so as to achieve the effect of smooth sliding of the sliding member on the rail member.

Figure 14:
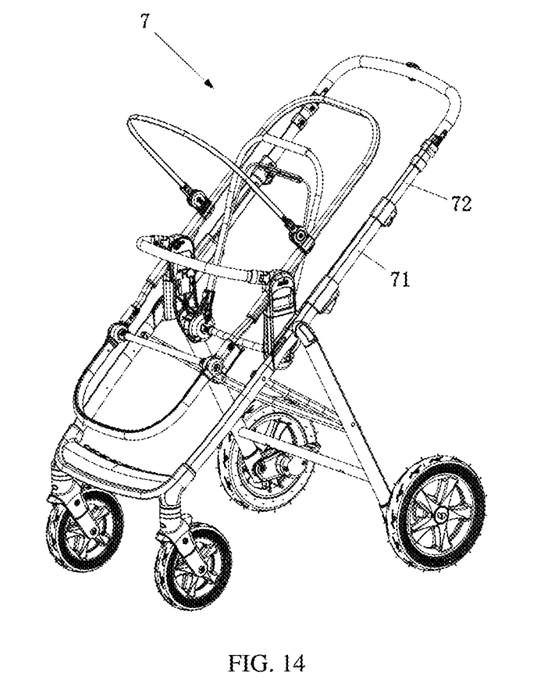
FIG. 14 is a perspective view of a stroller according to another embodiment of the present disclosure.
Figure 15:
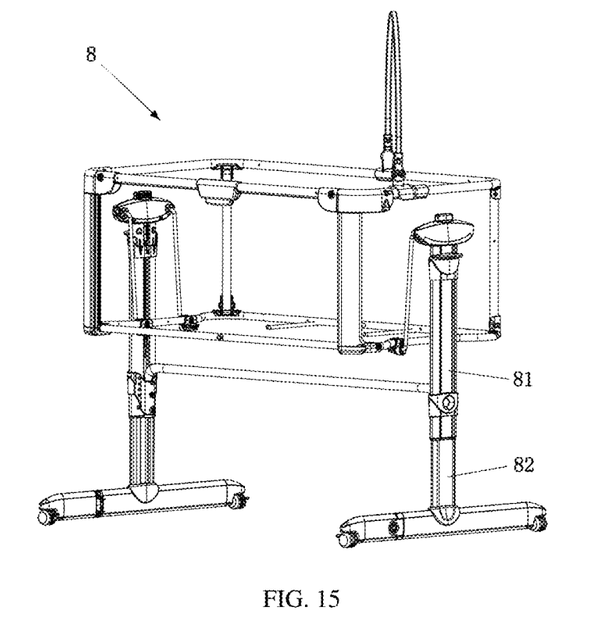
FIG. 15 is a perspective view of a crib according to another embodiment of the present disclosure.
Figure 16:
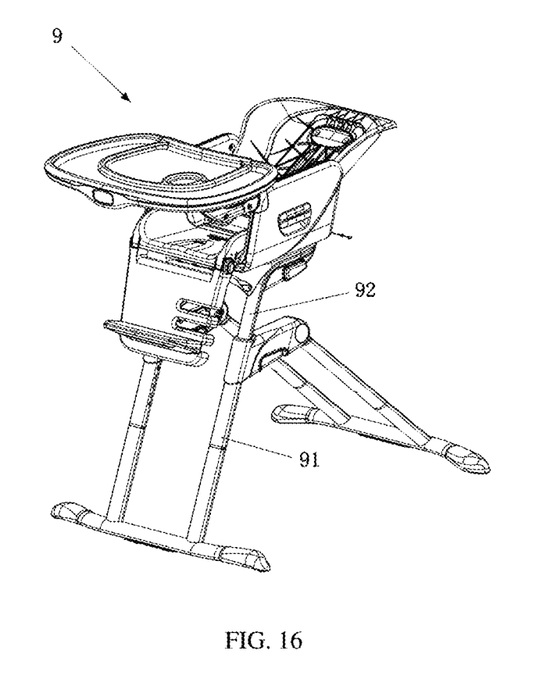
FIG. 16 is a perspective view of a dining chair according to another embodiment of the present disclosure.

In the above embodiments of the present disclosure, although the safety seat 1 is taken as a specific example and the embodiments of the first, second and third sets of sliding mechanisms are described in detail, the present disclosure is not limited to the sliding mechanisms of the safety seat 1. The present disclosure can also be applied to the sliding mechanism of different carrier for infants and young children than described above. For example, as shown in FIG. 14, a retractable armrest of a stroller 7 includes an outer tube 71 and an inner tube 72. The outer tube 71 is used as the rail member, and the inner tube 72 is used as the sliding member. For another example, as shown in FIG. 15, a retractable foot frame of a crib 8 includes an outer tube 81 and an inner tube 82. The outer tube 81 is used as the rail member, and the inner tube 82 is used as the sliding member. For another example, as shown in FIG. 16, a retractable foot frame of a dining chair 9 includes an outer tube 91 and an inner tube 92. The outer tube 91 is used as the rail member, and the inner tube 92 is used as the sliding member. Similar to the arrangements of the above-mentioned first set of sliding mechanisms in which the fixed base 33 and the plurality of balls 34 are provided between the outer tube 31 and the inner tube 32, in other carriers for infants and young children, such as in the examples shown in FIGS. 14 to 16, the guide sliding members may also be respectively disposed between the rail members and the sliding members to achieve the effect of smooth sliding, thus, these different carriers for infants and young children are fallen within the scope of the present disclosure.

The present disclosure has been disclosed above with preferred embodiments, however, those skilled in the art should understand that the embodiments are only for describing the present disclosure, and should not be construed as limiting the scope of the present disclosure. It should be noted that all changes and substitutions equivalent to those of the embodiments should be considered to be included within the scope of the present disclosure. Therefore, the protection scope of the present disclosure shall be subject to the appended claims.

What is claimed is:

1. A carrier for infants and young children with an improved sliding mechanism, comprising:
    a carrier body; and
    a load leg disposed on a front side of the carrier body, the load leg comprising:
        a rail member disposed on the carrier body;
        a sliding member connected to the rail member and capable of sliding linearly with respect to the rail member, and at least partially disposed in the rail member;
        a guide sliding member fixed to an end of the sliding member, the guide sliding member being in rolling contact with the rail member when the sliding member slides linearly with respect to the rail member; and
        a positioning member disposed between the rail member and the sliding member and configured to fix a position of the sliding member after the sliding member slides linearly with respect to the rail member.

2. The carrier for infants and young children with an improved sliding mechanism of claim 1, wherein the rail member comprises a tail end away from the carrier body, a through hole extending from the tail end is disposed in the rail member, the sliding member comprises a connecting end and an abutting end at different two ends, respectively, the connecting end is provided with the guide sliding member which is inserted into the through hole from the tail end to be connected to the rail member; and the abutting end is exposed to the rail member.

3. The carrier for infants and young children with an improved sliding mechanism of claim 2, wherein the guide sliding member comprises a fixed base and a plurality of balls, the fixed base is fixedly disposed on the connecting end, the fixed base comprises a plurality of mounting grooves arranged along a circumference of the fixed base, the plurality of balls are mounted in the plurality of mounting grooves along the circumference of the fixed base, and the connecting end is in rolling contact with an inner wall of the rail member through the plurality of balls.

4. The carrier for infants and young children with an improved sliding mechanism of claim 3, wherein the fixed base is integrally formed and comprises a coupling portion and a ring portion, the ring portion is located on an end of the coupling portion and protrudes laterally, the plurality of mounting grooves are arranged along a periphery of the ring portion; and each of the mounting grooves comprises an oil storage space, and the oil storage space is configured to store lubricating oil that provides auxiliary lubrication when the mounted balls are in rolling contact with the inner wall.

5. The carrier for infants and young children with an improved sliding mechanism of claim 4, wherein the coupling portion is fixedly connected to the connecting end by extending a shaft member through the coupling portion and the connecting end.

6. The carrier for infants and young children with an improved sliding mechanism of claim 5, wherein the tail end is provided with an end sleeve, which is inserted into the through hole to block the connecting end in the through hole, and the connecting end in the through hole is prevented from coming out of the rail member from the tail end.

7. The carrier for infants and young children with an improved sliding mechanism of claim 2, wherein the positioning member comprises a tube base and a fastener, the tube base is fixed on the tail end, the fastener is movably disposed on the tube base, the sliding member comprises a plurality of fastening holes arranged at intervals along a length direction of the sliding member, when an extending length of the sliding member with respect to the rail member is adjusted and the sliding member linearly slides to a selected position, the fastener is fastened to the fastening hole at a corresponding position.

8. The carrier for infants and young children with an improved sliding mechanism of claim 7, wherein the fastener is pivotally connected to the tube base by extending a shaft member through the fastener and the tube base, the fastener comprises an engaging portion and a toggle portion, the engaging portion is configured to correspond to and being capable of being respectively engaged with each of the fastening holes, the toggle portion is disposed on a different position from that of the engaging portion, a reset elastic member is sleeved on the shaft member, an end of the reset elastic member is abutted against the tube base, and another end of the reset elastic member is abutted against the toggle portion, when the toggle portion is toggled, the reset elastic member is compressed to generate a restoring elastic force; and when the toggle portion is released, the toggle portion is pushed back by the restoring elastic force, so that the engaging portion is reset to be engaged with the fastening hole at the corresponding position.

9. A carrier for infants and young children with an improved sliding mechanism, comprising:
- a carrier body;
- a rail member disposed on the carrier body;
- a sliding member connected to the rail member and capable of sliding linearly with respect to the rail member;
- a guide sliding member disposed on one of the rail member and the sliding member, and the sliding member being in rolling contact with the guide sliding member when sliding linearly with respect to the rail member; and
- a positioning member disposed between the rail member and the sliding member and configured to fix a position of the sliding member after the sliding member slides linearly with respect to the rail member,
- wherein the carrier body comprises a supporting frame, each of two sides of the supporting frame is provided with a rail member and a sliding member capable of sliding with respect to the supporting frame, the two sliding members are respectively provided with a connecting arm with an ISOFIX port at an end on the same side, and each of the sliding members is inserted through the corresponding rail member and is capable of sliding linearly,
- wherein each of the rail members is provided with a guide sliding member, each guide sliding member comprises a fixed base and a plurality of balls, the fixed base is fixedly in the rail member, the fixed base comprises a plurality of mounting grooves evenly distributed on a side surface of the fixed base, the plurality of balls are respectively mounted in the mounting grooves, and each of the rail members is in rolling contact with an outer wall of the sliding member inserted through the rail member, through the plurality of balls, and
- wherein the two sliding members respectively comprises a plurality of limiting holes arranged at intervals along a length direction of the respective sliding member, the positioning member is a stopper pin corresponding to each of the sliding members, when each of the sliding members linearly slides to a selected position with respect to the rail member through which the sliding member is inserted, the stopper pin is inserted into the limiting hole at a corresponding position for stopping and positioning.

\* \* \* \* \*